US011149779B2

United States Patent
Li et al.

(10) Patent No.: US 11,149,779 B2
(45) Date of Patent: Oct. 19, 2021

(54) NUT FASTENING CLIP AND NUT FASTENING CLIP ASSEMBLY

(71) Applicant: ILLINOIS TOOL WORKS INC., Glenview, IL (US)

(72) Inventors: Zhilin Li, Shanghai (CN); Bo Li, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 295 days.

(21) Appl. No.: 16/386,848

(22) Filed: Apr. 17, 2019

(65) Prior Publication Data

US 2019/0323544 A1    Oct. 24, 2019

(30) Foreign Application Priority Data

Apr. 18, 2018    (CN) .......................... 201810350051.5

(51) Int. Cl.
*F16B 37/04*    (2006.01)
*F16B 5/02*    (2006.01)

(52) U.S. Cl.
CPC ............ *F16B 37/041* (2013.01); *F16B 5/025* (2013.01)

(58) Field of Classification Search
CPC ...... F16B 37/041; F16B 5/025; F16B 5/0233; F16B 5/0216; F16B 5/0283
USPC .................................................. 411/970, 971
See application file for complete search history.

(56) References Cited

U.S. PATENT DOCUMENTS

| | | | | |
|---|---|---|---|---|
| 5,919,019 A * | 7/1999 | Fischer | ................. | F16B 37/043 411/182 |
| 7,226,260 B2 * | 6/2007 | Jackson, Jr. | .......... | F16B 21/076 411/112 |
| 7,568,870 B2 * | 8/2009 | Paquet | ................. | F16B 37/043 411/177 |
| 8,016,530 B2 * | 9/2011 | Johnson | ................. | F16B 5/065 411/173 |
| 8,240,966 B2 * | 8/2012 | Figge | .................... | F16B 5/0233 411/546 |
| 8,864,432 B2 * | 10/2014 | Figge | .................... | F16B 37/042 411/546 |
| 2007/0041808 A1 * | 2/2007 | Iwata | .................... | F16B 5/0233 411/386 |
| 2007/0092355 A1 * | 4/2007 | Burger | ................. | F16B 5/0233 411/535 |
| 2008/0286066 A1 | 11/2008 | Paquet | | |

(Continued)

FOREIGN PATENT DOCUMENTS

| | | |
|---|---|---|
| CN | 1640725 A | 7/2005 |
| CN | 104981617 A | 10/2015 |

(Continued)

*Primary Examiner* — Victor D Batson
*Assistant Examiner* — Amit Singh Dhillon
(74) *Attorney, Agent, or Firm* — Quarles & Brady LLP (57) ABSTRACT

A nut fastening clip comprises a substrate, and a sleeve. The substrate has an upper surface, a lower surface, a first lateral side, and a second lateral side. The substrate defines an upper opening. The first lateral side is opposite the second lateral side. The sleeve extends from the substrate. The sleeve defines a lower opening in communication with the upper opening. The sleeve has an outer face and a first anti-rotation plane disposed on the outer side face, adjacent to the first lateral side, and connected to the substrate.

20 Claims, 7 Drawing Sheets

(56) References Cited

U.S. PATENT DOCUMENTS

| | | | | |
|---|---|---|---|---|
| 2010/0026028 A1* | 2/2010 | Smith | ................... | B60R 13/04 |
| | | | | 296/29 |
| 2015/0267734 A1* | 9/2015 | Boyer | .................. | F16B 37/043 |
| | | | | 411/520 |
| 2015/0330427 A1* | 11/2015 | Johnson | ................ | F16B 5/0233 |
| | | | | 411/34 |
| 2015/0377266 A1* | 12/2015 | Ortega Dona | ........ | F16B 5/0233 |
| | | | | 411/366.1 |
| 2016/0016522 A1 | 1/2016 | Smith et al. | | |
| 2016/0144801 A1* | 5/2016 | Huelke | ............... | B60R 13/0206 |
| | | | | 24/295 |
| 2016/0208839 A1* | 7/2016 | Vidal | ...................... | F16B 37/02 |
| 2017/0292557 A1* | 10/2017 | Sherrill | ................... | F16B 37/04 |
| 2019/0257339 A1* | 8/2019 | Deperro | ............... | F16B 13/124 |

FOREIGN PATENT DOCUMENTS

| | | |
|---|---|---|
| CN | 105324582 A | 2/2016 |
| CN | 207470541 U | 6/2018 |
| KR | 101391230 B1 | 5/2014 |
| WO | 2010020342 A1 | 2/2010 |
| WO | 2018237365 A1 | 12/2018 |

\* cited by examiner

NUT FASTENING CLIP AND NUT FASTENING CLIP ASSEMBLY

RELATED APPLICATION

This present application claims the benefit of and priority to China Patent Application No. 201810350051.5, filed Apr. 18, 2018, which is incorporated herein by reference in its entirety.

TECHNICAL FIELD

The present application relates to panel fasteners, and in particular to a nut fastening clip that is configured between two panels and has an adjustable length by receiving a screw rod, a bolt or another connecting device.

BACKGROUND

In the automobile industry, parts often need to be fixedly attached to one another. There is a particular distance between a fixing point and a mounting point, and a fixing operation is performed without changing the distance. For example, for a device for fixing a part, such as a vehicle roof rack, onto a vehicle roof, it is needed to keep a distance between a bottom panel and a top panel of the vehicle roof relatively constant. Due to the tolerance in welding and manufacturing, this distance between top and bottom roof panels varies between different mounting positions. Therefore, it is needed to provide a fastener with an adjustable spacer length to maintain the distance between the bottom panel and the top panel to prevent the vehicle roof from collapsing when a roof rack rail is mounted.

SUMMARY

In one aspect, a nut fastening clip comprises a substrate and a sleeve. The substrate has an upper surface, a lower surface, a first lateral side, and a second lateral side. The substrate defines an upper opening. The first lateral side is opposite the second lateral side. The sleeve extends from the substrate. The sleeve defines a lower opening in communication with the upper opening. The sleeve has an outer side face and a first anti-rotation plane disposed on the outer side face, adjacent to the first lateral side, and connected to the substrate.

In another aspect, a nut fastening clip assembly comprises a substrate, a sleeve, and a bolt. The substrate has an upper surface, a lower surface, a first lateral side, and a second lateral side. The substrate defines an upper opening. The first lateral side is opposite the second lateral side. The sleeve extends from the substrate. The sleeve defines a lower opening in communication with the upper opening. The sleeve is internally threaded. The sleeve has an outer side face and a first anti-rotation plane disposed on the outer side face, adjacent to the first lateral side, and connected to the substrate. The bolt is configured to threadably engage with the sleeve.

In a further aspect, a nut fastening clip comprises a substrate, a sleeve, a holding arm, and a deflection arm. The substrate defines a first opening. The sleeve extends downwardly from the substrate and defines a second opening in communication with the first opening. The holding arm extends downwardly from the substrate and has a lower end. The deflection arm extends outwardly and upwardly from the lower end.

BRIEF DESCRIPTION OF THE DRAWINGS

These and other features and advantages of the present application may be better understood by reading the following detailed description with reference to the accompanying drawings. In all the accompanying drawings, the same reference numerals represent the same parts, in the figures.

DETAILED DESCRIPTION

Particular embodiments of the present application are described below with reference to the accompanying drawings which constitute part of the description. It should be understood that although the terms such as "front", "rear", "upper", "lower", "left", and "right" indicating directions in the present application are used to describe various exemplary structural parts and elements in the present application, these terms used herein are merely used for ease of description and are determined based on the exemplary orientation shown in the accompanying drawings. Since the embodiments disclosed in the present application can be arranged in different directions, these terms indicating orientations are only illustrative and should not be considered as limitations. In the following accompanying drawings, if possible, the same reference numerals are used for the same components, and similar reference numerals are used for similar components.

Figure 1A:
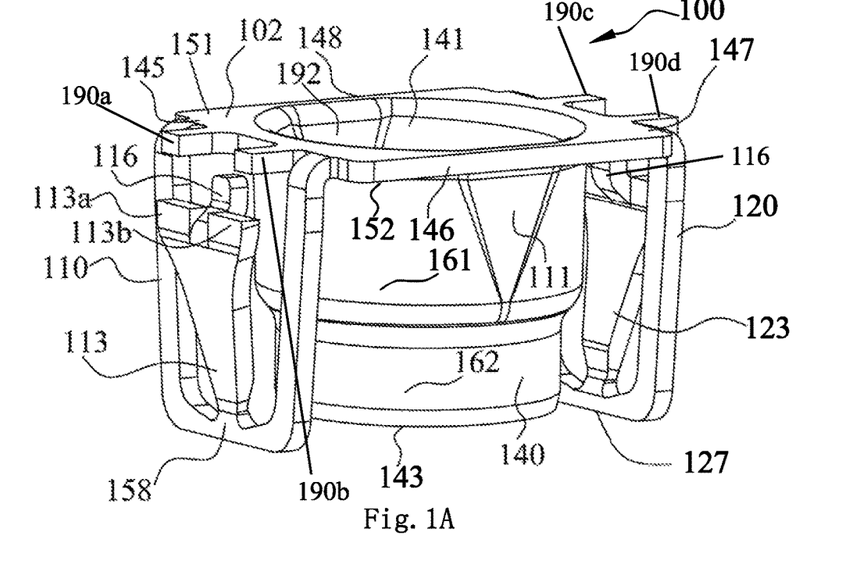
FIG. 1A is a perspective view of a nut fastening clip according to the present application.
Figure 1B:
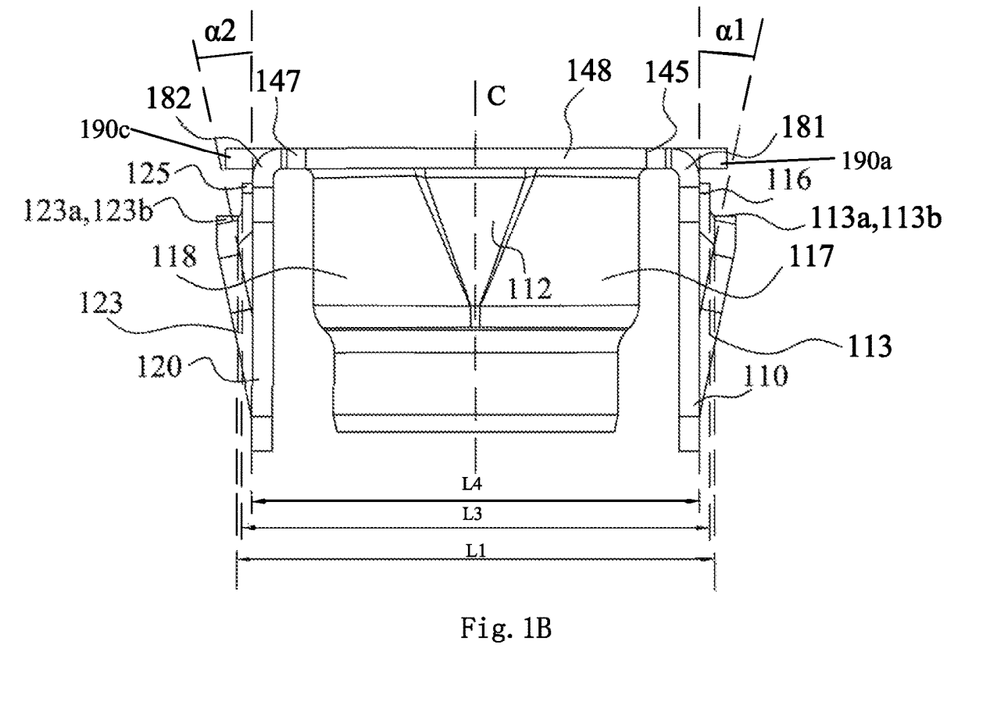
FIG. 1B is a side view of the nut fastening clip in FIG. 1A when viewing from the right side of the nut fastening clip in FIG. 1A.
Figure 1C:
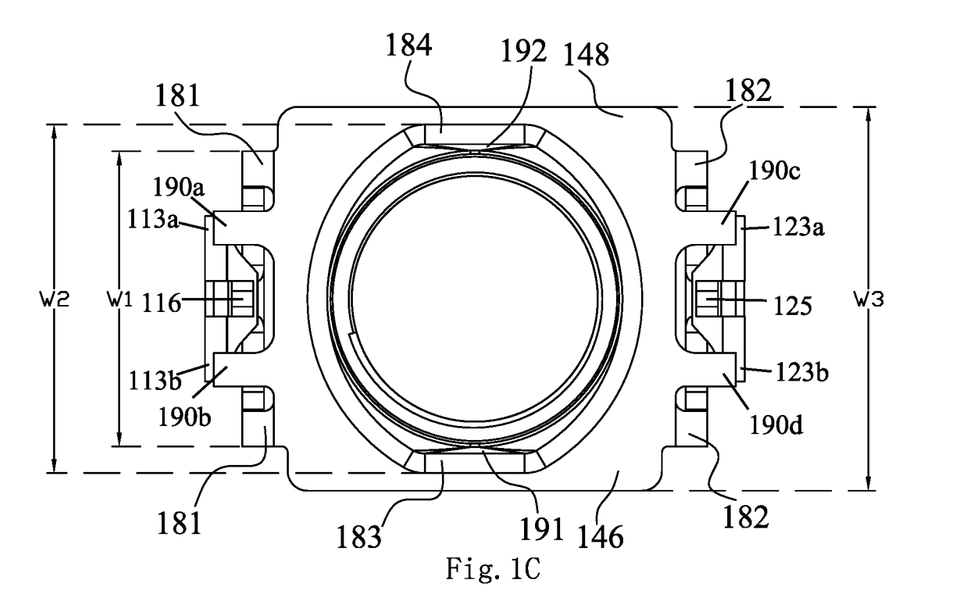
FIG. 1C is a top view of the nut fastening clip in FIG. 1A.

FIG. 1A is a perspective view of a nut fastening clip according to the present application. FIG. 1B is a side view of a nut fastening clip in FIG. 1A when viewing from the right side of the nut fastening clip in FIG. 1A, and shows a second anti-rotation plane 112 of the nut fastening clip. FIG. 1C is a top view of the nut fastening clip in FIG. 1A.

As shown in FIGS. 1A and 1B, the nut fastening clip 100 comprises a substrate 102, a sleeve 140, a first holding arm 110 and a second holding arm 120 that extend from two sides of the substrate 102, and a first deflection arm 113 and a second deflection arm 123 that are respectively disposed on the first holding arm 110 and the second holding arm 120.

The substrate 102 comprises an upper surface 151 and a lower surface 152. The substrate 102 substantially has a square shape and has four lateral sides, that is, as shown in FIG. 1A, a first lateral side 146 (a front side), a second lateral side 148 (a rear side), a third lateral face 145 (a left face) and a fourth lateral face 147 (a right face). The first lateral face 146 and the second lateral face 148 are opposite each other, and the third lateral face 145 and the fourth lateral face 147 are opposite each other. The sleeve 140 extends through the substrate 102, and has an upper opening 141 in the upper surface 151 of the substrate 102 and a lower opening 143 below the lower surface 152 of the substrate 102. Certainly, the square shape is only an exemplary shape of the substrate 102, and a substrate 102 having another shape is also in the protection scope of the present application.

The sleeve 140 has a head portion 161 and a tail portion 162, and the head portion 161 is located above the tail portion 162. The head portion 161 and the tail portion 162 are substantially sleeve-shaped and are coaxially disposed. The inner diameter of the head portion 161 is greater than the inner diameter of the tail portion 162. A first anti-rotation plane 111 (as shown in FIG. 1A) and the second anti-rotation plane 112 (as shown in FIG. 1B) are provided on an outer side face of the head portion 161. The first anti-rotation plane 111 is positioned below the first lateral side 146 and is connected to the substrate 102. The second anti-rotation plane 112 is positioned below the second lateral side 148 and is connected to the substrate 102. The first anti-rotation plane 111 and the second anti-rotation plane 112 are both planes. The remaining portion of the outer side face of the head portion 161 of the sleeve 140 comprises two arc-shaped side face portions 117 and 118 connected to the first anti-rotation plane 111 and the second anti-rotation plane 112. In other word, in one embodiment, the first anti-rotation plane 111 and the second anti-rotation plane 112 may be formed of a cylindrical sleeve being deformed by an external force. In one embodiment, the first anti-rotation plane 111 and the second anti-rotation plane 112 are triangles that gradually narrow from top to bottom. Certainly, a triangle is only an exemplary shape, and any other shape that can form a plane is in the scope of the present application. The first anti-rotation plane 111 and the second anti-rotation plane 112 have the same structure and are symmetrically disposed. The anti-rotation planes are disposed to prevent the nut fastening clip from rotating during the use of the nut fastening clip, which will be described in detail below.

Although two anti-rotation planes are shown in the examples in FIGS. 1A and 1B, only one anti-rotation plane disposed on the sleeve 140 can also prevent the nut fastening clip from rotating in the present application. In addition, as shown in FIG. 1, a first inner plane 191 is disposed at a position corresponding to the first anti-rotation plane 111, and a second inner plane 192 is disposed at a position corresponding to the second anti-rotation plane 112, on an inner side face of the head portion 161. The first inner plane 191 and the second inner plane 192 are respectively disposed in parallel to the first anti-rotation plane 111 and the second anti-rotation plane 112. Moreover, the shapes of the first inner plane 191 and the second inner plane 192 respectively correspond to the shapes of the first anti-rotation plane 111 and the second anti-rotation plane 112. Therefore, it is more convenient to manufacture the sleeve 140. The distance between the first inner plane 191 and the second inner plane 192 is greater than the inner diameter of the tail portion 162. In one embodiment, the cylindrical sleeve is deformed by an external force to form the first anti-rotation plane 111 and the second anti-rotation plane 112, and accordingly form the first inner plane 191 and the second inner plane 192.

Further, as shown in FIG. 1A, the first holding arm 110 and the second holding arm 120 respectively extend downward from the third lateral side 145 and the fourth lateral side 147 of the substrate 102. The first holding arm 110 on the left side can be conveniently seen from the angle in FIG. 1A. In an example of the embodiment shown in FIG. 1A, the structure of the second holding arm 120 on the right side is the same as that of the first holding arm 110. The first holding arm 110 is used as an example below to describe the structures of two holding arms. The first holding arm 110 has a U-shaped structure that opens upward. The U-shaped structure forms a space and the bottom of the U-shaped structure is a lower end 158 of the first holding arm 110. A first deflection arm 113 extends outward and upward from the lower end 158 of the first holding arm 110. In one example, the first deflection arm 113 extends outward and upward from the bottom portion of the U-shaped first holding arm 110. Certainly, instead of extending from the bottom of the U-shaped structure, the first deflection arm 113 may also extend from a side face of the lower end 158 of the first holding arm 110. The joint between the first deflection arm 113 and the first holding arm 110 is elastic, so that the first deflection arm 113 may deflect inward toward the first holding arm 110 (that is, the first deflection arm 113 may deflect into the space formed by the U-shaped structure of the first holding arm 110) and restore the original shape. The U-shaped structure of the first holding arm 110 may be used to accommodate the first deflection arm 113 that deflects inward by a particular angle. Certainly, the first holding arm 110 may have a non-U-shaped structure, but a structure providing space which is provided on the first holding arm 110 and can accommodate to a certain degree the first deflection arm 113 that deflects inward.

Figure 3:
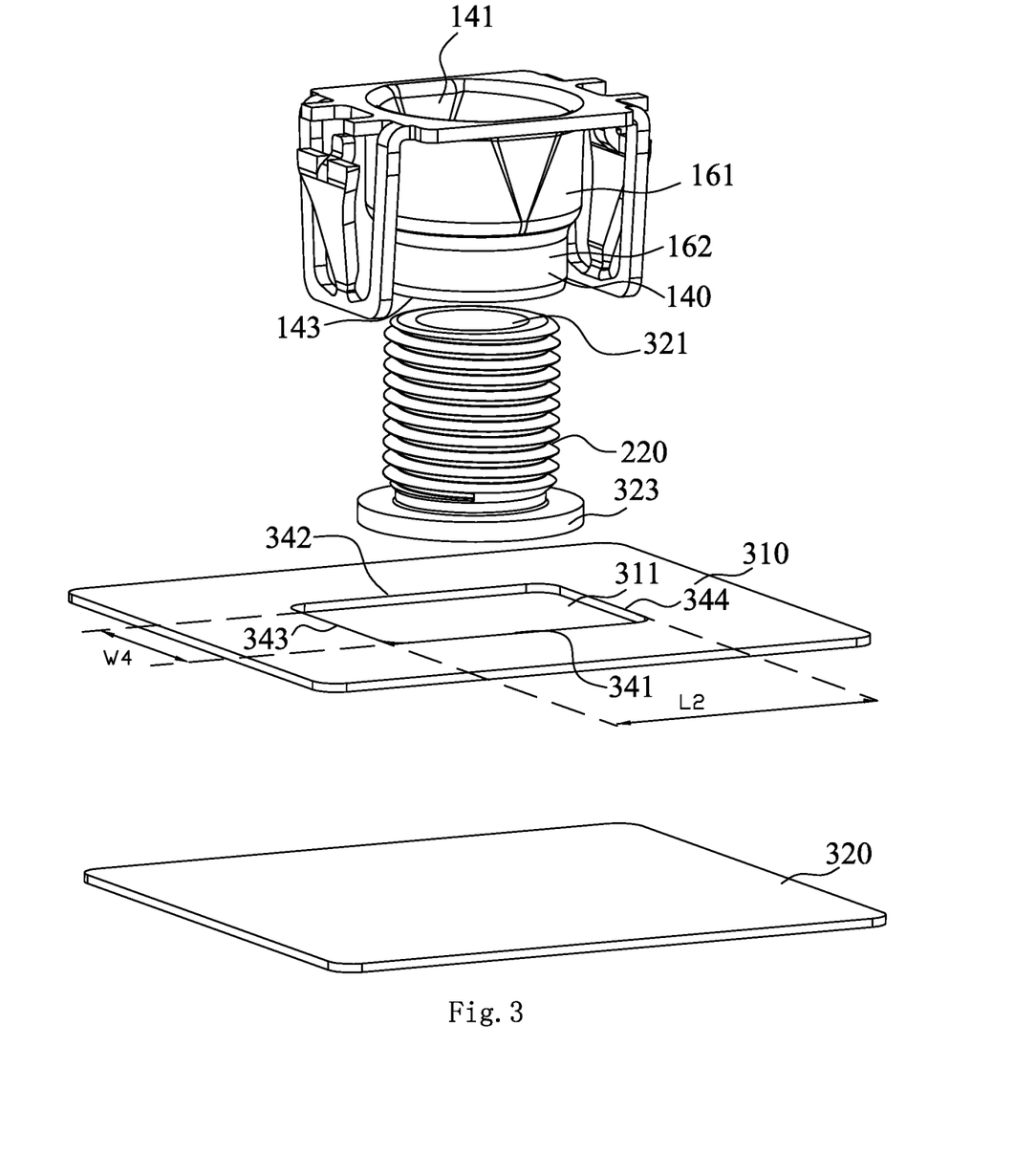
FIG. 3 is a schematic diagram of a nut fastening clip, a bolt and two panels.

As shown in FIGS. 1A and 1B, the nut fastening clip 100 further comprises a first release operation portion 116. The first release operation portion 116 is disposed at an upper portion of the first deflection arm 113. In one example, the first release operation portion 116 is an arm that extends upward and inward from the upper portion of the first deflection arm 113, which may also be referred to as a first release operation arm 116. In one example, the upper portion of the first deflection arm 113 has a U-shaped structure, and the first release operation portion 116 extends from the bottom of the U-shaped structure. The top ends of the first deflection arm 113 are ends of the U-shaped structure, so that two abutting ends 113a and 113b are formed at the ends of the U-shaped structure. After the nut fastening clip 100 is inserted in a panel 310 (as shown in FIG. 3), the abutting ends 113a and 113b of the first deflection arm 113 can abut against a lower surface of the panel 310 to prevent the nut fastening clip 100 from being pulled out from the panel 310. Certainly, the upper portion of the first deflection arm 113 may have a non-U-shaped structure, but an abutting end formed by the upper portion of the first deflection arm 113. The first release operation portion 116 may also not extend out of the bottom of the U-shaped structure but extends from a side face of the upper portion of the first deflection arm 113.

The second holding arm 120 has the same structure as the first holding arm 110, and is arranged symmetrically with the first holding arm 110 relative to the centerline C of the nut fastening clip 100. The second deflection arm 123 similarly extends outward and upward from a lower end 127 of the second holding arm 120. A second release operation portion 125 that extends upward and inward is disposed at an upper portion of the second deflection arm 123. The second deflection arm 123 and the second release operation portion 125 respectively have the same structures as the first deflection arm 113 and the first release operation portion 116, and are respectively symmetrically disposed with the first deflection arm 113 and the first release operation portion 116 relative to the centerline C of the nut fastening clip 100.

As shown in FIG. 1B, an included angle α1 is formed between the first deflection arm 113 and the first holding arm 110, and an included angle α2 is formed between the second deflection arm 123 and the second holding arm 120. In one example, the included angle α1 and the included angle α2 are substantially the same. The angle α1 between the first deflection arm 113 and the first holding arm 110 and the angle α2 between the second deflection arm 123 and the second holding arm 120 are configured to enable the first deflection arm 113 and the second deflection arm 123 to respectively stretch outward from the first holding arm 110 and the second holding arm 120 when no force is applied. In this case, the distance L1 is formed between an inner side of the abutting ends 113a and 113b of the first deflection arm 113 and an inner side of abutting ends 123a and 123b of the second deflection arm 123. The height of the top ends (that is, abutting ends) of the first deflection arm 113 and the second deflection arm 123 is lower than that of the lower surface 152 of the substrate 102, so that the distance D1 is formed between the top ends of the first deflection arm 113 and the second deflection arm 123 and the lower surface 152 of the substrate 102 (referring to FIGS. 4A-4D). The distance L3 is provided between outer sides of the top end of the first release operation arm 116 and the top end of a second release operation arm 125. The distance L4 is provided between outer sides of the first holding arm 110 and the second holding arm 120. The distance L3 between the outer side of the top end of the first release operation arm 116 and the outer side of the top end of the second release operation arm 125 is less than the length L2 of a hole 311 in the panel 310 (referring to FIG. 3).

As shown in FIGS. 1B and 1C, the width W3 is provided between the first lateral side 146 and the second lateral side 148 of the substrate 102 of the nut fastening clip 100. A first connecting portion 183 is formed at the joint between the first anti-rotation plane 111 and the substrate 102. Similarly, a second connecting portion 184 is formed at the joint between the second anti-rotation plane 112 and the substrate 102. The distance W2 is provided between outer sides of the first connecting portion 183 and the second connecting portion 184. A third connecting portion 181 is formed at the joint between the first holding arm 110 and the substrate 102. The width W1 is provided between outer sides of the third connecting portion 181. Similarly, a fourth connecting portion 182 is formed at the joint between the second holding arm 120 and the substrate 102. The width W1 is also provided between outer sides of the fourth connecting portion 182. W3 is greater than W2, and W2 is greater than W1. The hole 311 of the panel 310 has a width W4 (referring to FIG. 3).

Figure 2:
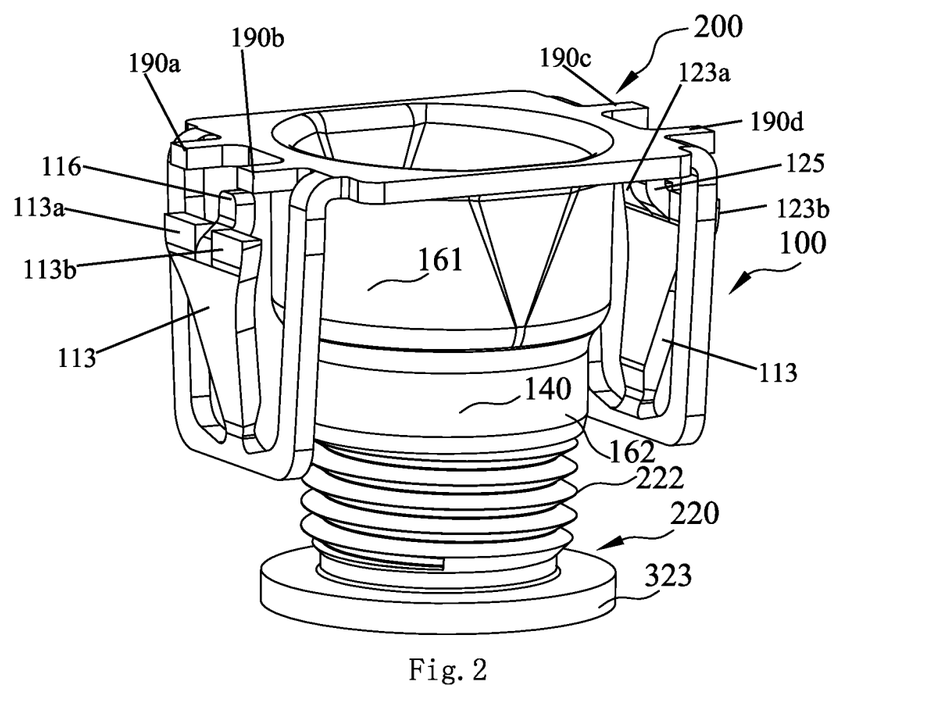
FIG. 2 is a perspective view of a nut fastening clip in which a bolt is mounted.

FIG. 2 is a perspective view of a nut fastening clip assembly 200 having the nut fastening clip 100 shown in FIG. 1A and a bolt. FIG. 3 is an exploded schematic diagram of the nut fastening clip assembly 200 shown in FIG. 2 and two panels.

As shown in FIG. 2, the nut fastening clip assembly 200 comprises the nut fastening clip 100 and the bolt 220. A thread (not shown) is disposed on an inner surface of the sleeve 140 of the nut fastening clip 100. In one embodiment of the present application, a thread is disposed on an inner surface of the tail portion 162. An external thread 222 is disposed at an outer surface of the bolt 220. The bolt 220 may be threaded into or threaded out of the sleeve 140 from the lower opening 143 of the sleeve 140, in order to adjust the overall length of the nut fastening clip assembly 200. Because the inner diameter of the tail portion 162 is less than the distance between the first inner plane 191 and the second inner plane 192 and is less than the inner diameter of the two side face portions 117 and 118 of the head portion 161, the bolt 220 is not in contact with an inner surface of the head portion 161 and can be freely threaded into or threaded out of the sleeve 140 when the bolt 220 is threaded into or threaded out of the sleeve 140.

As shown in FIG. 3, in one embodiment, the bolt 220 has a receiving channel 321 extending in a lengthwise direction thereof. When the height (or the length) of the nut fastening clip assembly 200 needs to be adjusted, a fastening driving tool may protrude into the receiving channel of the bolt 321 from an upper opening 141 of the sleeve 140. The depth by which the bolt 220 is threaded into the nut fastening clip 100 is adjusted by using the fastening driving tool, so as to adjust the height (or the length) of the nut fastening clip assembly 200. In one embodiment of the present application, the bolt 220 may also be solid and a cross recess, a slotted recess or another recess that can be conveniently screwed with a tool is provided at an upper end of the bolt 220, and the bolt 220 may be screwed using a corresponding screw driver.

One of the applications of the nut fastening clip assembly 200 with an adjustable length is a scenario in which a particular distance needs to be kept between two mounting panels. The length of the entire nut fastening clip assembly 200 can be adjusted by adjusting the depth by which the bolt 220 is threaded into the sleeve 140 of the nut fastening clip 100 to adapt to different distances.

In one embodiment, after the nut fastening clip assembly 200 is inserted in the hole 311 of the upper panel 310 and is mounted in place, the first deflection arm 113 and the second deflection arm 123 of the nut fastening clip 100 can prevent the nut fastening clip assembly 200 from falling out of the hole 311. A head portion 323 of the bolt 220 can then abut against a lower bearing panel 320 by adjusting the depth by which the bolt 220 is threaded into the sleeve 140 of the nut fastening clip 100. In other words, the nut fastening clip assembly 200 is fixed on a panel 310 by using the nut fastening clip 100, and a driving tool is inserted from an upper opening 141 of the sleeve 140 to rotate the bolt 220 relative to the nut fastening clip 100, so that the head portion 323 of the bolt 220 contacts with the lower bearing panel, and the length of the nut fastening clip assembly 200 can adapt to and keep the distance between two panels.

A process of mounting the nut fastening clip 100 in the hole 311 of the panel 310 is described as follows. The length L2 of the hole 311 is less than the distance L1 between inner sides of the top end of the first deflection arm 113 and the top end of the second deflection arm 123. Therefore, when the nut fastening clip 100 is inserted downward in the hole 311, inner edges (343, 344) of the hole 311 in the width direction force the first deflection arm 113 and the second deflection arm 123 to deflect toward an inner side. After the top end of the first deflection arm 113 and top end of the second deflection arm 123 pass through the hole 311, the first deflection arm 113 and the second deflection arm 123 deflect and stretch toward an outer side in virtue of their own elastic forces, so that the top end of the first deflection arm 113 and the top end of the second deflection arm 123 (that is, the abutting ends) can abut against a lower surface of the panel 310 so as to prevent the nut fastening clip assembly 200 from falling out of the hole 311.

When the nut fastening clip 100 is mounted in the hole 311 of the panel 310, the substrate 102 of the nut fastening clip 100 is located above the panel 310 and the first deflection arm 113 and the second deflection arm 123 are located below the panel 310. The first deflection arm 113 and the second deflection arm 123 can abut against the lower surface of the panel 310 at the abutting ends thereof. Thus, the nut fastening clip 100 may be clipped in the hole 311.

In actual application, the nut fastening clip assembly 200 may need cooperation with a sealing member at the above to enable the nut fastening clip assembly 200 to form a seal with another component above the nut fastening clip assembly 200. Therefore, after the nut fastening clip assembly 200 is inserted in the hole 311 of the upper panel 310, the nut fastening clip 100 cannot fall out of the hole 311 and the nut fastening clip 100 can move within a particular range relative to the panel 310 in a direction perpendicular to the panel, for example, it can move by 0.1-3 mm, so that the upper surface 151 of the substrate 102 can contact with the sealing member above the nut fastening clip 100. In this case, the first release operation arm 116 and the second release operation arm 125 can enter the hole 311, and can move relative to the hole 311 in a direction perpendicular to the panel 310. The first release operation arm 116 and the second release operation arm 125 pass through the hole 311 of the panel 310 to make the top end of the first release operation arm 116 and the top end of the second release operation arm 125 locate above the panel 310, so as to remove the nut fastening clip 100 from the above of the panel 310. The first release operation arm 116 and the second release operation arm 125 are configured to be operated to remove the nut fastening clip 100 from the above of the panel 310 by an operator.

Figure 4A:
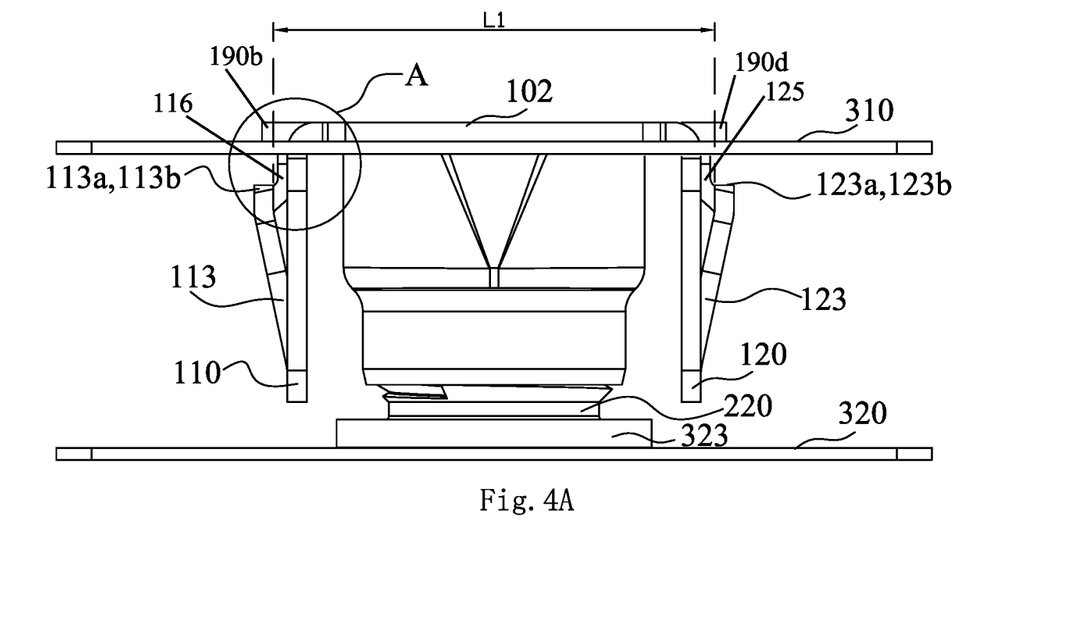
FIG. 4A is a schematic diagram of a nut fastening clip assembly mounted between two panels and in an initial position.
Figure 4B:
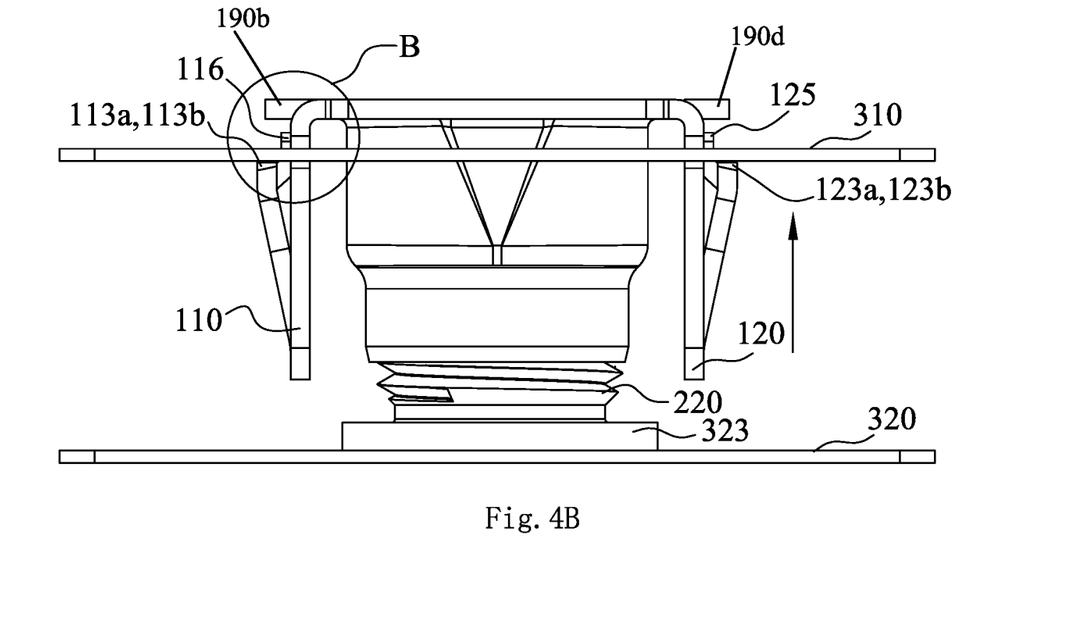
FIG. 4B is a schematic diagram of a nut fastening clip assembly, mounted between two panels and in the farthest position that it can reach.
Figure 4C:
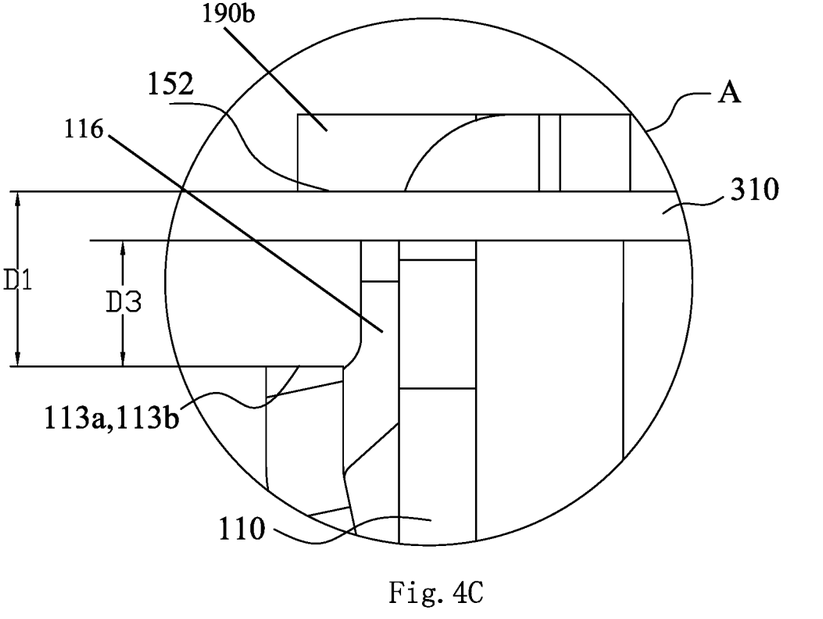
FIG. 4C is a partial enlarged view of a portion A in FIG. 4A.
Figure 4D:
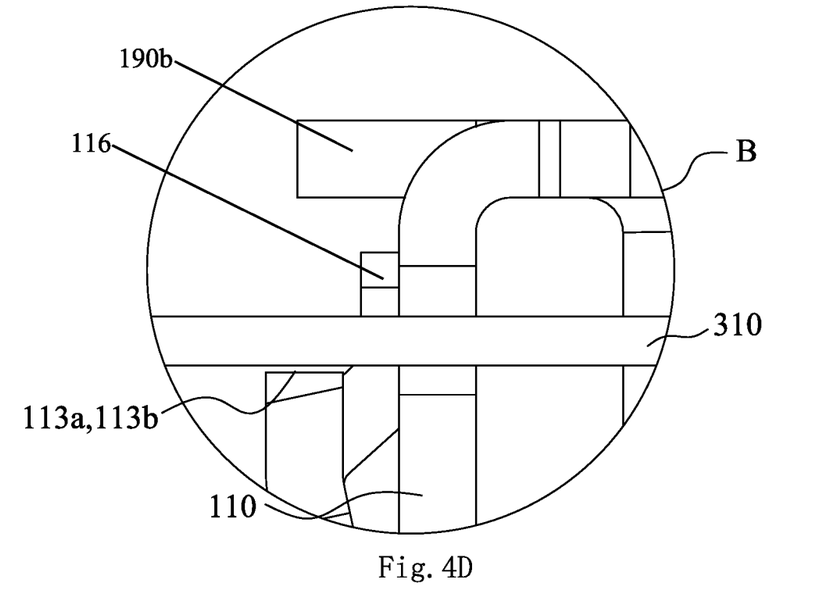
FIG. 4D is a partial enlarged view of a portion B in FIG. 4B.

FIG. 4A is a schematic diagram of a nut fastening clip assembly 200 mounted between two panels and in an initial position; FIG. 4B is a schematic diagram of the nut fastening clip assembly 200 mounted between two panels and in the farthest position that it can reach; FIG. 4C is a partial enlarged view of a portion A in FIG. 4A; and FIG. 4D is a partial enlarged view of a portion B in FIG. 4B.

As shown in FIGS. 4A and 4C, in a process of inserting the nut fastening clip 100 into the hole 311 (the hole 311 can be seen more clearly in FIG. 3) of the panel 310 from above the panel 310, the first deflection arm 113 and the second deflection arm 123 abut against inner edges (343, 344) in the width direction of the hole 311 and deflect inward in virtue of a force, so that the first deflection arm 113 and the second deflection arm 123 may pass through the hole 311 of the panel 310. After the nut fastening clip 100 is inserted in place, the first deflection arm 113 and the second deflection arm 123 restore the original shape. After the insertion is completed, the substrate 102 of the nut fastening clip 100 is located above the panel 310, and the first deflection arm 113 and the second deflection arm 123 are located below the panel 310.

To enable the nut fastening clip 100 to be inserted in the hole 311 of the panel 310, the distance L4 between the outer sides of the first holding arm 110 and the second holding arm 120 is configured to be less than the length L2 of the hole 311 of the panel 310. The width W1 of the outer side of the third connecting portion 181 at the joint between the first holding arm 110 and the substrate 102 and the width W1 of the outer side of the fourth connecting portion 182 at the joint between the second holding arm 120 and the substrate 102 are configured to be less than the width W4 of the hole 311 of the panel 310. Moreover, the width W3 between the first lateral side 146 and the second lateral side 148 of the substrate 102 is configured to be greater than the width W4 of the hole 311 of the panel 310, so that the substrate 102 of the nut fastening clip 100 is located above the panel 310 after the insertion is completed.

The distance L1 between the inner side of the abutting ends 113a and 113b of the first deflection arm 113 and the inner side of the abutting ends 123a and 123b of the second deflection arm 123 is greater than the length L2 of the hole 311 of the panel 310. Therefore, after the nut fastening clip 100 is inserted in the hole 311 of the panel 310, the abutting ends 113a and 113b of the first deflection arm 113 and the abutting ends 123a and 123b of the second deflection arm 123 can abut against the lower surface of the panel 310, so that the nut fastening clip 100 cannot fall out of the hole 311.

In one embodiment of the present application, as shown in FIG. 4C, the distance D1 is provided between the abutting ends 113a and 113b of the top end of the first deflection arm 113 and the lower surface 152 of the substrate 102. Similarly, the distance D1 is also provided between the top ends of the abutting ends 123a and 123b of the second deflection arm 123 and the lower surface 152 of the substrate 102. Distance D1 is configured to be greater than the thickness of the substrate 102. After the first holding arm 110 and the second holding arm 120 are inserted in the hole 311 of the panel 310, the panel 310 can be accommodated between the top ends of the first deflection arm 113 and the substrate 102, and between the second deflection arm 123 and the substrate 102. The nut fastening clip 100 may move by a particular distance D3 relative to the panel 310 in a direction perpendicular to the panel 310. Distance D3 is approximately a difference between distance D1 and the thickness of the substrate 102. In one embodiment of the present application, the range of a movable distance D3 is 0 mm to 8 mm.

In the case shown in FIGS. 4A and 4C, the nut fastening clip assembly 200 is in an initial state of mounting. Subsequently, a driving tool is used to drive the bolt 220 to rotate until the head portion 323 of the bolt abuts against the lower bearing panel 320. Next, the driving tool continues to be used to drive the bolt 220 to rotate. The head portion 323 of the bolt abuts against the lower bearing panel 320, and the nut fastening clip 100 can move upward at the same time to enable the substrate 102 to be far away from the panel 310, until the upper surface 151 of the substrate 102 and the sealing member (not shown) above the nut fastening clip 100 come into contact and form a seal. The farthest position that the nut fastening clip 100 can reach is shown in the positions shown in FIGS. 4B and 4D.

As shown in FIGS. 4B and 4D, when the nut fastening clip 100 reaches the farthest position, the abutting ends 113a and 113b of the first deflection arm 113 and the abutting ends 123a and 123b of the second deflection arm 123 abut against the lower surface of the panel 310 to prevent the nut fastening clip 100 from falling out of the panel 310. The movement of the nut fastening clip 100 from the position shown in FIG. 4A to the position shown in FIG. 4B is used to adapt to the sealing requirement of the component above the nut fastening clip 100, so that the nut fastening clip 100 and the sealing member above the nut fastening clip 100 can fit tightly to achieve a sealing effect.

Figure 5A:
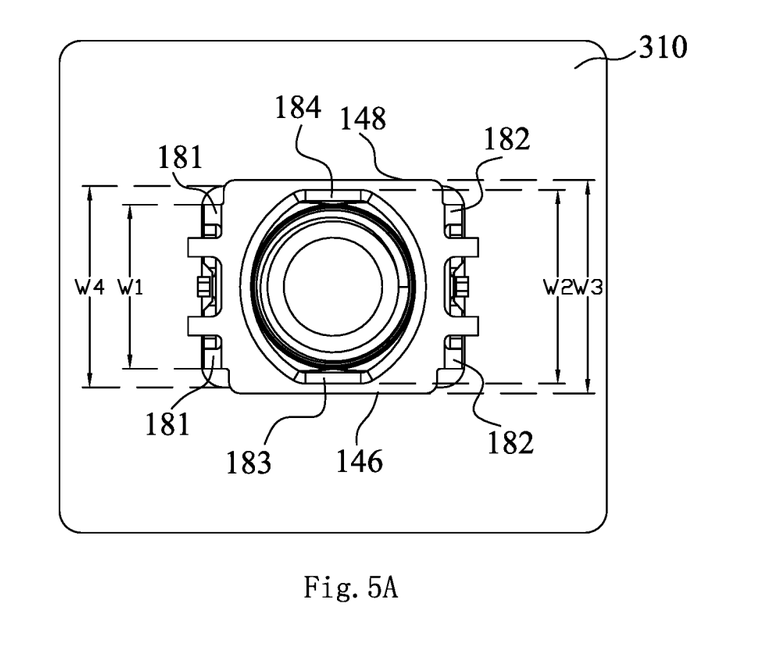
FIG. 5A is a top view of a nut fastening clip being mounted on a panel.
Figure 5B:
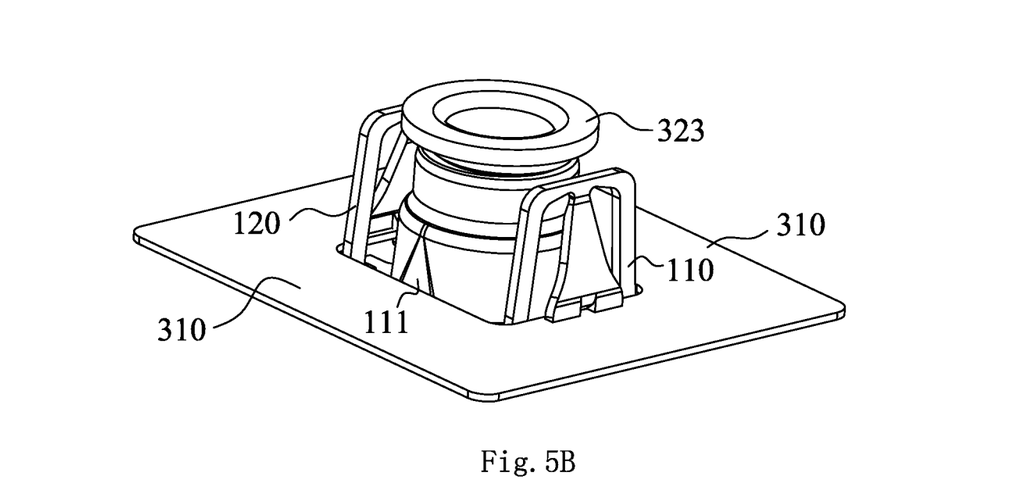
FIG. 5B is a perspective view of a nut fastening clip mounted on a panel when viewing from the bottom side.

FIG. 5A is a top view of a nut fastening clip 100 being mounted on a panel; FIG. 5B is a perspective view of a nut fastening clip 100 mounted on a panel when viewing from the bottom side. As shown in FIG. 5A and FIG. 5B, the width W1 of the outer side of the third connecting portion 181 connecting the first holding arm 110 and the substrate 102, and the width W1 of the outer side of the fourth connecting portion 182 connecting the second holding arm 120 and the substrate 102 are both less than the width W4 of the hole 311. The width W1 and the width W4 are different by a particular value, for example, 1 mm to 10 mm, so that the movement of the nut fastening clip 100 from the position in FIG. 4A to the position in FIG. 4B is easy, and the automatic assembly is facilitated. In the present application, the distance W2 between an outer side of the first connecting portion 183 connecting the first anti-rotation plane 111 and the substrate 102 and the outer side of the second connecting portion 184 connecting the second anti-rotation plane 112 and the substrate 102 is close to the width W4 of the hole 311, and is only slightly less than the width W4 of the hole 311. Therefore, after the nut fastening clip 100 is inserted in the hole 311, an outer side of the first anti-rotation plane 111 and an outer side of the second anti-rotation plane 112 respectively abut against inner edges (341, 342) of the hole 311 in the lengthwise direction, so that the nut fastening clip 100 is prevented from rotating relative to the panel 310. That is, in the present application, the nut fastening clip 100 mounted on the panel 310 restricts the rotation of the nut fastening clip 100 by the fit between the outer sides of the first anti-rotation plane 111 and the second anti-rotation plane 112 and the hole 311, and the rotation of the nut fastening clip 100 is no longer restricted by the cooperation between the first holding arm 110 and the top end of the second holding arm 120 and the hole 311.

Figure 6A:
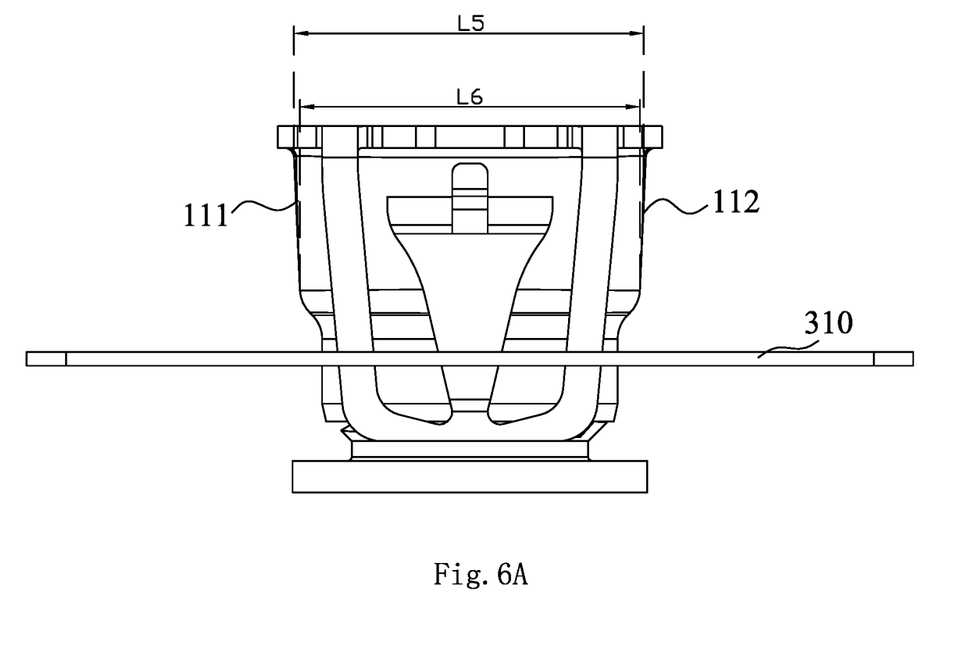
FIG. 6A is a side view of a nut fastening clip assembly in a process of being mounted on a panel.
Figure 6B:
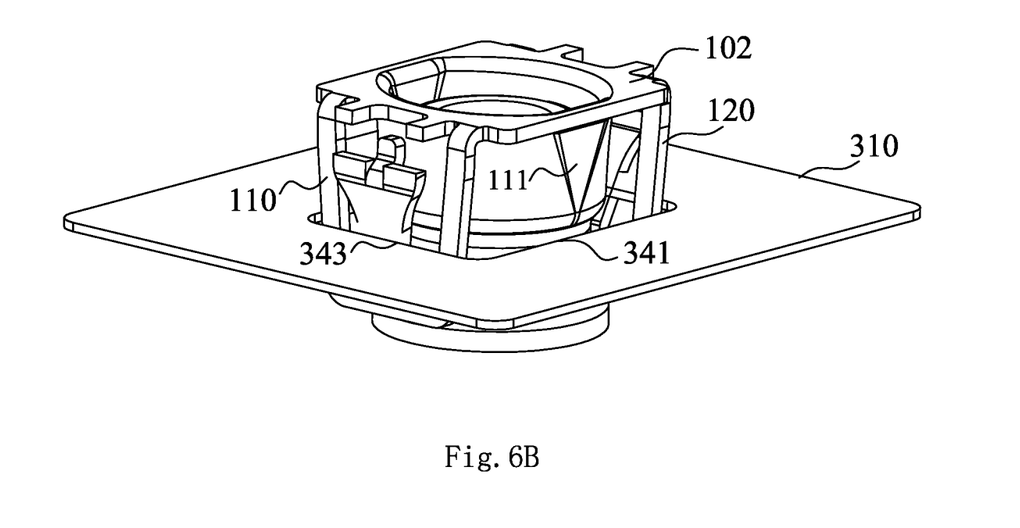
FIG. 6B is a perspective view of a nut fastening clip assembly in a process of being mounted on a panel.

FIG. 6A is a side view of a nut fastening clip assembly in a process of being mounted on a panel; and FIG. 6B is a view from the bottom side of a nut fastening clip assembly in a process of being mounted on a panel. As shown in FIGS. 6A and 6B, the first anti-rotation plane 111 and the second anti-rotation plane 112 are planes that incline inward from top to bottom. That is, the distance L5 between the top ends of the first anti-rotation plane 111 and the second anti-rotation plane 112 is greater than the distance L6 between the bottom ends of the first anti-rotation plane 111 and the second anti-rotation plane 112. When the nut fastening clip assembly 200 is mounted, the structures of inclined surfaces of the first anti-rotation plane 111 and the second anti-rotation plane 112 produce a guiding effect, so that the nut fastening clip 100 can be inserted in the hole 311 more easily.

An application of the nut fastening clip in the present application is described below with reference to FIG. 3. For example, a vehicle roof has two panels, that is, a lower bearing panel 320 and an upper decorative panel 310. A particular distance is provided between the two panels. When a roof rack or another heavy object is mounted on the vehicle roof, the roof rack or another heavy object needs to be fixed on the lower bearing panel 320 by means of a decoration panel 310, so that there is sufficient strength to support a heavy object such as a luggage. Moreover, the roof rack is located outside the vehicle roof. A sealing structure is disposed at the joint between the roof rack and the decorative panel 310 to prevent impurities from outside from entering a vehicle panel through mounting positions of the roof rack (for example, prevent water from permeating into the vehicle in rainy or snowy weather). For example, the sealing member is disposed near a mounting hole of the roof rack and is used to form a seal with the upper surface 151 of the substrate 102 of the nut fastening clip assembly 200. The nut fastening clip assembly 200 passes through the upper decorative panel 310 to directly fix a roof rack rail or heavy object on the lower bearing panel. The length of the nut fastening clip assembly 200 is adjusted at the same time. The upper surface 151 of the substrate 102 can be attached to the sealing member, and the top ends of the first deflection arm 113 and the second deflection arm 123 abut against the lower surface of the upper decorative panel 310, so that the upper decorative panel 310 has sufficient rigidity to counteract an elastic force generated by the sealing member being compressed. When the nut fastening clip assembly 200 of the present application is used to mount the roof rack on the vehicle roof, firstly, as shown in FIG. 3, the nut fastening clip assembly 200 is fixed on the upper panel 310 through the nut fastening clip 100. A driving tool is inserted in the upper opening 141 of the sleeve 140. The driving tool is rotated to enable the bolt 220 to rotate relative to the nut fastening clip 100, so as to adjust the length of the nut fastening clip assembly 200. In the process that the driving tool drives the bolt 220 to rotate, firstly, the head portion 323 of the bolt 220 abuts the lower bearing panel 320, so that the nut fastening clip assembly 220 reaches the position shown in FIG. 4A. Subsequently, the bolt 220 continues to be rotated to enable the nut fastening clip assembly 220 to reach the position shown in FIG. 4B. Finally, the mounting hole in the roof rack is aligned with the receiving channel 321 of the bolt 220, and an end of a fixing screw rod (not shown) is then inserted in the mounting hole in the roof rack and the bolt 220. After an insertion end of the fixing screw rod passes through the bolt 220, and a fastening nut (not shown) is screwed at the insertion end, so that the roof rack can be fastened and mounted. In this case, the sealing member and the upper surface 151 of the substrate 102 are tightly attached.

With reference to FIGS. 1A, 1B, 1C, 2, 4A, 4B, 4C, and 4D, the nut fastening clip 100 further includes first, second, third, and fourth abutting tabs 190a, b, c, d. The first and second abutting tabs 190a, b extend laterally from the third lateral side 145 of the substrate 102. The third and fourth abutting tabs 190c, d extend laterally from fourth lateral side 147 of the substrate 102. Looking specifically at FIG. 1C, the first release operation portion 116 is between the first and second abutting tabs 190a, b. The second release operation portion 125 is between the third and fourth abutting tabs 190c, d. Looking specifically at FIG. 1C, the abutting ends 113a, 113b respectively face the first and second abutting tabs 190a, b. The abutting ends 123a, 123b respectively face the third and fourth abutting tabs 190c, d. Looking specifically at FIG. 4A, the first deflection arm 113 extends outboard of the first and second abutting tabs 190a, b. The second deflection arm 123 extends outboard of the third and fourth abutting tabs 190c, d.

A plurality of nut fastening clip assemblies 200 with an adjustable height are used to keep the distance between two panels. When the fixing screw rod is used to fix the roof rack on the vehicle roof, the upper decorative panel does not collapse, and a seal can be formed between the roof rack and the nut fastening clip assembly 200, thereby preventing water from permeating into a vehicle. Generally, after the nut fastening clip assembly 200 is mounted in place, the head portion 323 of the bolt 220 abuts the lower bearing panel 320, and the lower surface of the substrate 102 leaves the panel 310, so that the substrate 102 and the sealing member located above the substrate can form a seal. Moreover, the top ends of the first deflection arm 113 and the second deflection arm 123 abut against the lower surface of the panel 310 and support the panel 310, so that the length of the nut fastening clip assembly 200 adapts to and keeps the distance between two panels.

The foregoing structural design is used in the present application, so that not only is it easy to mount the nut fastening clip of the present application, but also the nut fastening clip can be kept in a panel more securely, so that it is more convenient to adjust the depth by which a bolt is threaded into the nut fastening clip to adjust the length of a nut fastening clip assembly. Moreover, the nut fastening clip of the present application is further designed to easily fit a sealing member, so that a seal is formed at a position where the nut fastening clip and another component are mounted. The nut fastening clip of the present application has a simple and compact structure and can be easily integrally molded by sheet metal stamping, so that industrial production is facilitated and production costs are reduced.

Although only some features of the present application are illustrated and described herein, a person skilled in the art may make various improvements and changes. Therefore, it should be understood that the appended claims intend to cover all the foregoing improvements and changes that fall within the substantial spirit and scope of the present application.

We claim:

1. A nut fastening clip, comprising:
    a substrate having an upper surface, a lower surface, a first lateral side, and a second lateral side, the substrate defining an upper opening, the first lateral side being opposite the second lateral side; and
    a sleeve extending from the substrate, defining a lower opening in communication with the upper opening, and having an outer side face and a first anti-rotation plane disposed on the outer side face, adjacent to the first lateral side, and connected to the substrate,
    wherein a first connecting portion is between the first anti-rotation plane and the substrate.

2. The nut fastening clip of claim 1, wherein the sleeve has a second anti-rotation plane disposed on the outer side face, adjacent to the second lateral side, and connected to the substrate.

3. The nut fastening clip of claim 2, wherein the substrate has a third lateral side and a fourth lateral side disposed opposite one another and respectively adjacent to the first lateral side and the second lateral side; and further comprising:
    a second connecting portion between the second anti-rotation plane and the substrate;
    a first holding arm extending downwardly from the third lateral side;
    a third connecting portion between the first holding arm and the substrate;
    a second holding arm extending downwardly from the fourth lateral side; and
    a fourth connecting portion between the second holding arm and the substrate, wherein:
    an outside width of the third connecting portion is less than an outside distance between the first connecting portion and the second connecting portion, and
    an outside width of the fourth connecting portion is less than the outside distance between the first connecting portion and the second connecting portion.

4. The nut fastening clip of claim 3, further comprising:
    a first deflection arm extending outwardly and upwardly from a first lower end of the first holding arm to define a first angle with the first holding arm; and
    a second deflection arm, extending outwardly and upwardly from a second lower end of the second holding arm to define a second angle with the second holding arm.

5. The nut fastening clip of claim 2, wherein:
    the sleeve includes arc-shaped first and second side face portions, and
    the first and second anti-rotation planes are respectively connected to the first and second arc-shaped side face portions.

6. The nut fastening clip of claim 2, wherein the first anti-rotation plane and the second anti-rotation plane incline inwardly from top to bottom.

7. The nut fastening clip of claim 2, wherein the first anti-rotation plane and the second anti-rotation plane are triangular and gradually narrow from top to bottom.

8. The nut fastening clip of claim 2, wherein the nut fastening clip is integrally formed by sheet metal stamping.

9. The nut fastening clip of claim 1, wherein:
    the sleeve has a head portion and a tail portion,
    the tail portion is internally threaded, and
    an inner diameter of the head portion is greater than an inner diameter of the tail portion.

10. A nut fastening clip assembly, comprising:
    a substrate having an upper surface, a lower surface, a first lateral side, and a second lateral side, the substrate defining an upper opening, the first lateral side being opposite the second lateral side;
    a sleeve extending from the substrate, defining a lower opening in communication with the upper opening, and being internally threaded, the sleeve having an outer side face and an anti-rotation plane disposed on the outer side face, adjacent to the first lateral side, and connected to the substrate; and
    a bolt configured to threadably engage with the sleeve,
    wherein a connecting portion is between the anti-rotation plane and the substrate.

11. The nut fastening clip of claim 10, further comprising a holding arm extending downwardly from the substrate.

12. The nut fastening clip of claim 11, further comprising a deflection arm extending outwardly and upwardly from a lower end of the holding arm.

13. The nut fastening clip of claim 10, wherein the sleeve includes an arc-shaped side face portion connected to the anti-rotation plane.

14. The nut fastening clip of claim 10, wherein the anti-rotation plane inclines inwardly from top to bottom.

15. The nut fastening clip of claim 10, wherein the anti-rotation plane is triangular and gradually narrows from top to bottom.

16. The nut fastening clip of claim 10, wherein:
    the sleeve has a head portion and a tail portion,
    the sleeve is internally threaded along the tail portion, and
    an inner diameter of the head portion is greater than an inner diameter of the tail portion.

17. A nut fastening clip, comprising:
    a substrate defining a first opening and a lateral side;
    a sleeve extending downwardly from the substrate, the sleeve defining a second opening in communication with the first opening, and having an outer side face and an anti-rotation plane disposed on the outer side face, adjacent to the lateral side, and connected to the substrate;
    a holding arm extending downwardly from the substrate, the holding arm having a lower end; and
    a deflection arm extending outwardly and upwardly from the lower end,
    wherein a connecting portion is between the anti-rotation plane and the substrate.

18. The nut fastening clip of claim 17, wherein:
the deflection arm includes an upper portion and a release operation portion, and
the release operation portion extends upwardly and inwardly from the upper portion.

19. The nut fastening clip of claim 17, wherein:
the deflection arm includes a U-shaped upper portion, and
the U-shaped upper portion includes first and second abutting ends.

20. The nut fastening clip of claim 17, further comprising an abutting tab extending laterally from the substrate.

* * * * *